(12) United States Patent
Zhao

(10) Patent No.: US 6,171,635 B1
(45) Date of Patent: Jan. 9, 2001

(54) COFFEE SUBSTITUTE

(76) Inventor: Iris G Zhao, 1969 Zonal Ave., Los Angeles, CA (US) 90033

( * ) Notice: Under 35 U.S.C. 154(b), the term of this patent shall be extended for 0 days.

(21) Appl. No.: 09/240,832

(22) Filed: Jan. 27, 1999

Related U.S. Application Data

(63) Continuation-in-part of application No. 08/852,238, filed on May 6, 1997, now abandoned.

(51) Int. Cl.⁷ .................................. A23F 5/44; A23L 2/38
(52) U.S. Cl. ........................ 426/596; 426/590; 426/598; 426/634
(58) Field of Search .................. 426/596, 634, 426/590, 598

(56) References Cited

U.S. PATENT DOCUMENTS

| | | | |
|---|---|---|---|
| H673 | 9/1989 | Hullah et al. ................. | 426/596 |
| 3,532,506 | 10/1970 | Rey et al. ..................... | 99/71 |
| 3,666,483 | 5/1972 | Tessmar ....................... | 99/65 |
| 3,666,484 | 5/1972 | Garkin ......................... | 99/77 |
| 3,966,395 | 6/1976 | Workman ..................... | 426/596 |
| 4,022,916 | 5/1977 | La Tour ....................... | 426/285 |
| 4,092,436 | 5/1978 | MacDonald et al. ......... | 426/478 |
| 4,142,002 * | 2/1979 | Spotholz et al. . | |
| 4,214,007 | 7/1980 | Hase et al. ................... | 426/44 |
| 4,374,864 | 2/1983 | Hufnagel et al. ............. | 426/594 |
| 4,389,422 | 6/1983 | Hudak ......................... | 426/388 |
| 4,699,798 | 10/1987 | Maclean ....................... | 426/596 |
| 4,923,855 | 5/1990 | Jensen ......................... | 514/188 |
| 5,013,752 | 5/1991 | Dobbins ....................... | 514/505 |
| 5,128,131 | 7/1992 | Matayama et al. ........... | 424/195 |
| 5,158,770 | 10/1992 | Saito et al. ................... | 424/195 |
| 5,194,259 | 3/1993 | Soudant et al. .............. | 424/401 |
| 5,322,688 | 6/1994 | Schwabe ...................... | 424/195 |
| 5,389,370 | 2/1995 | O'Reilly et al. .............. | 424/195 |
| 5,399,348 | 3/1995 | Schwabe ...................... | 424/195 |
| 5,427,812 | 6/1995 | Hatch et al. .................. | 426/548 |
| 5,464,619 | 11/1995 | Kuznick et al. .............. | 424/195 |
| 5,480,657 | 1/1996 | Allen ........................... | 424/617 |
| 5,523,108 | 6/1996 | Wansot et al. ................ | 486/597 |
| 5,569,458 | 10/1996 | Greenberg .................... | 426/125 |

* cited by examiner

Primary Examiner—Anthony J. Weier

(57) ABSTRACT

A coffee-type beverage base is prepared by light roast method under 200° C. and originated from grain and legume. This coffee substitute has a pleasant aroma, and can be used as a carrier of nutritional supplement or herb therapy as well as an additive of coffee, tea, or chocolate. This novel drink is especially suitable for individuals who suffer from conditions making them coffee intolerant, e.g., pregnancy, or those who suffer form hypoglycemia, hypertension, arrhythmia, insomnia, or gastric irritation.

12 Claims, 3 Drawing Sheets

PROCESSING THE NUTRITIONAL COFFEE SUBSTITUTE

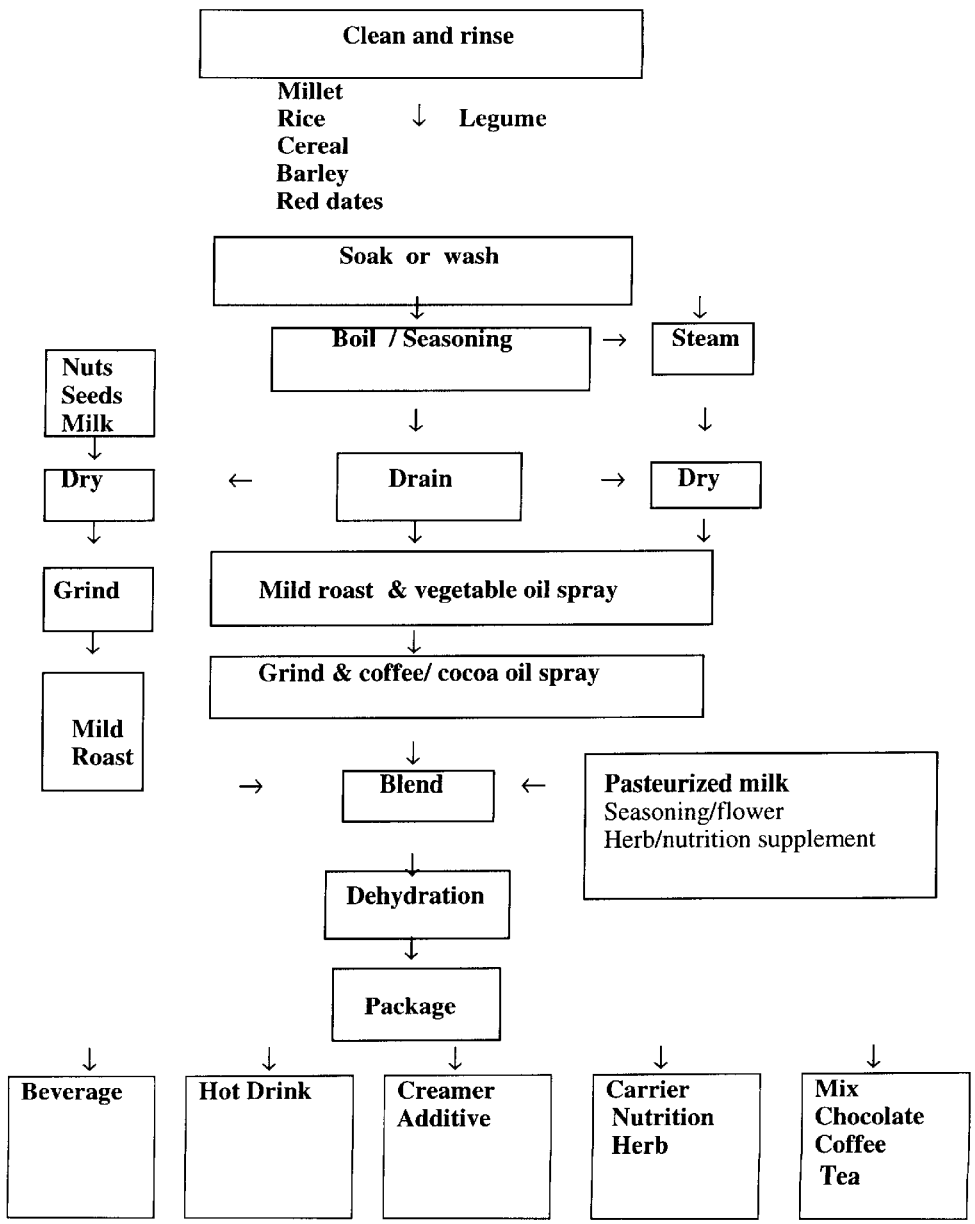
DRAWING 1. PROCESSING THE NUTRITIONAL COFFEE SUBSTITUTE

DRAWING 2. FOOD STRUCTURE & SYNERGIC HEALTH FUNCTION

| GRAINS | BEANS | NUTS/SEEDS | HERB/FLOWER/VEG |
|---|---|---|---|
| Aroma<br>Quick calorie supply<br>High fiber<br>Low fat<br>Low protein<br>High vitamin, e.g., B<br><br>Essential mineral<br>e.g., K<br><br>Health function, e.g.,<br>Roast wheat sooths<br>stomach irritation.<br>Barley: diuretic effect<br>Glutinous rice<br>reduces polydipsia | Complex CHO:<br>Dual energy supply<br>High fiber<br>Rich protein: black<br>bean contains high<br>arginine, phenylalnine<br><br>Essential mineral<br>e.g., zinc<br><br>Health function, e.g.,<br>Navy bean (white bean<br>& black kidney beans<br>↓ cholesterol | Aroma: walnut,<br>sesame, chestnut,<br>almond, peanut<br>Dual calories<br>supply<br>Low saturated fat<br><br><br><br><br>Health function,<br>e.g.,<br>Walnut improves<br>body function &<br>memory | Rose aroma raises spirit<br>Orange skin reduces<br>stomach pain<br><br><br>Health function, e.g.,<br>↓ Hyperglycemia &<br>hypertension: Lycium<br>Chinese/barbarum 6-12g<br>↓ Hyperglycemia/hungry:<br>Rehmannia glutinosa 6-30g<br>Ophiopogan japonicus 9-<br>15g<br>↓Cholesterol/TG &<br>↑Coronary A. flow:<br>Ganoderma lucidum 1-3g<br>Ginseng improves tiredness,<br>hypotension, immune,<br>weakness after<br>chemotherapy<br>Garlic helps immune<br>Ginger sooths the body |

   

COFFEE SUBSTITUTE

AROMA      COMPLEX CHO      AROMA      AROMA
Vitamin      High protein
Low fat      Vitamin/Mineral/Essential elements

HEALTH FUNCTION

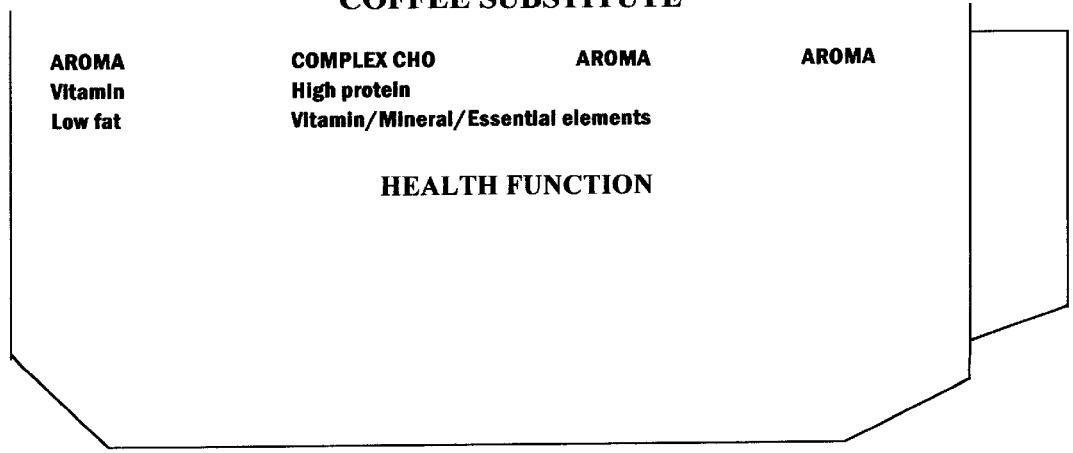

DRAWING 3. IDEAL FOOD ABSORPTION & GLUCOSE/LIPID RESPONSE
A. FOOD ABSORPTION
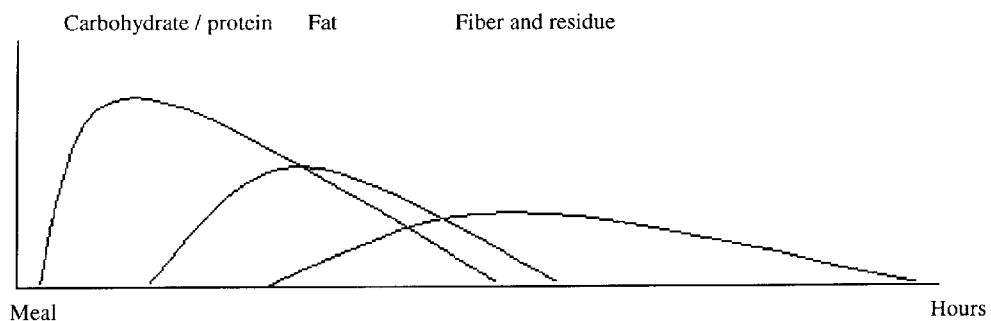
B. FOOD ABSORPTION
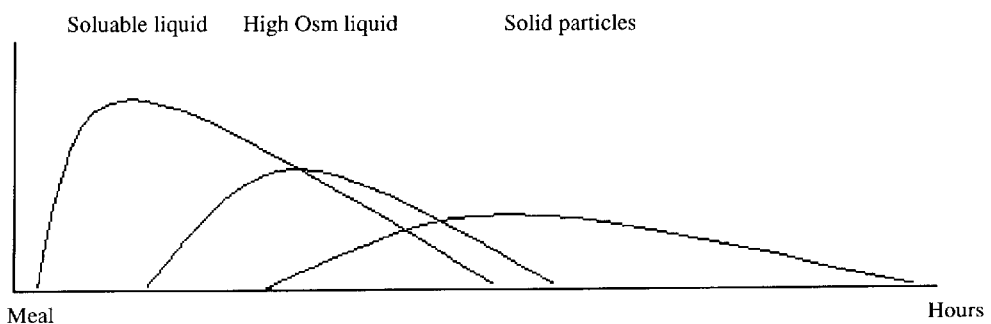
C. POSTPRANDIAL GLUCOSE/LIPID LEVELS
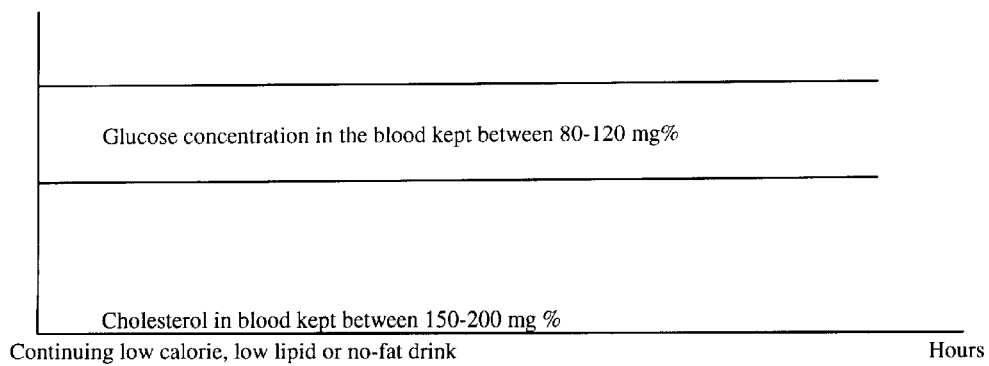

COFFEE SUBSTITUTE

RELATED APPLICATION

This is a continuation-in-part application of copending application Ser. No. 08/852,238 filed in May 6, 1997 now abandoned.

FIELD OF THE INVENTION

The present invention relates to coffee substitutes and, more particularly, to a non-caffeine beverage base produced from grain and legume, which provide synergetic coaction among the ingredients.

BACKGROUND OF THE DISCLOSURE

Until the middle of this century, development of medical treatment for human disease was intimately connected with the plant kingdom. Major breakthroughs such as digitalis, aspirin, morphine, vincristin and antibiotics have resulted from the study and usage of natural products. Gaps remain between the prescribed pharmaceutical pills and natural food therapy.

The human body contains about 55–60% water. Humans by nature enjoy drinking liquids. Liquids containing energy supply, mineral, nutritional supplement and medicine are always the first choice for a patient after surgery and IV nutrition. Coffee possesses a pleasant aroma and is an enjoyable taste experience that many believe reduces stress during the workday. Consequently, the United States consumes about 70% of the world's coffee crop, or about 3 cups a day for each American. Coffee beverages contain about 100 mg caffeine per cup (per 8 ounces). Coffee stimulates the central nervous system, increases diuresis, dilates the vascular system and combats sleep, which is possibly linked to the caffeine-mediated glycogen sparing effect secondary to an increased rate of lipolysis.

However, coffee can penetrate the placenta and is possibly related to birth defects. So, the Food and Drug Administration (FDA) has moved caffeine off its "Generally Recognized as Safe" (GRA) list to an interim list in 1980. Public concern has developed. Avoiding caffeine helps to prevent undesirable stimulation which might contribute to spontaneous ventricular fibrillation in a damaged heart, especially early in the convalescent period following a myocardial infarction (Hemzacek KI: Dietary protocol for the patient who has suffered a myocardial infarction, J. Am Diet Asso 72:182, 1978).

Thus, many decaffeinated coffee procedures have been taught to reduce the caffeine content and its side effects. In U.S. Pat. No. H673 in 1989, Hallah et al provided over-roast (400–450° F. for 45–60 minutes) and extract to obtain an instant coffee substitute from soybeans. Kay even discussed a preparation of a coffee substitute with soybeans in 1980 (U.S. Pat. No. 4,288,409) and further mixed the product with other nutritional supplements (e.g. dandelion root) and conventional coffee to form a beverage. In addition, Shirbroun teaches beverage made largely from soybeans (U.S. Pat. No. 4,187,324, 1980).

However, Hullah et al, Kay, and Shirbroun never suggested or attempted to make an independent satisfactory beverage. It is well known that coffee aroma arises from more than 500 volatile compounds and complicated process. Therefore, the fact that those prior products lack the attractive aroma is not entirely surprising in light of the methods employed to process soybeans etc.

Just as every disease has its own specialized medical care, it is logical to have a specialized food product to address different categories of disease and health concerns. Dr. Staney J. Dudrick et al. conducted a pilot study in 1985 on a 40-years old man who suffered from Type IIB hyperlipidemia and frequent angina. His cardiac catherization showed 100% occlusion of his right coronary artery and diffuse atherosclerotic lesions in the left coronary arteries. After intravenous 20–50% Dextrose with optimal amino acids, mineral, vitamin, mineral and non-fat anticholesterol perfusion, his angina disappeared within 2 days and his coronary artery was reopened and he was able to go back to work (Russell C. Maulitz, Editor: The Three Leading Killer Diseases in America, Rutgers Univ. Press, 1988, 1989). However, this treatment needs continuously TPN intravenous infusion in hospital and is not a beverage for consumer's daily use.

Actually, many grains contain high arginine-phenylalanine-isolucine-valine-serine-aspartic acid-leucine-alanine (which have the highest inverse cholesterol rate as: −0.66, −0.64, −0.57, −0.55, −0.54, −0.37, −0.30, −0.25 according to Dr. Dudrick's research) and "No fat" (less than 0.5% fat is considered no-fat by FDA). Also most non-soy legumes, chestnuts, and lotus seed contain not more than 1.5% by weight of lipid which mainly is unsaturated fatty acids. Grains contain a simple carbohydrate, which can be quickly absorbed similarly to Dextrose. Grains have delicious taste, low protein, "no-fat", and no cholesterol. The variety of grains posses broad individual nutritional characteristics and covers many health concerns.

Grains/legumes are good carriers for most nutritional supplements and have the capacity to provide a cooperative relationship with every added ingredients, e.g., nuts/seeds/herbs/flowers/vegetables. This broad range will not only compensate for each other's deficiency but also coact together to provide a coffee-type product containing optimal amino acids, quick absorbable simple carbohydrate, long lasting complex carbohydrate, fiber and starch to slow gastrointestine digestion and absorption, essential mineral and nutritional supplement, and very little fatty acids for an anticholesterol function. This coffee substitute prepared mainly from light roasted grains/legumes/seeds is able to provide a delicious natural anticholesterol beverage with similar ingredients to Dr. Dudrick intravenous perfusion solution. All of these support the present invention for merging the enjoyment from drinking a novel coffee-type beverage with food and herb therapy (phytotherapy) for a synergetic health function.

SUMMARY OF THE INVENTION

It is an objective of the present invention to produce an independent coffee-type beverage to overcome the above-noted deficiencies of prior products.

It is another objective of the present invention to produce a hot beverage having a novel aroma from a plant grown in the United States which is in ample supply, healthy, and even better accepted than tropical coffee.

It is an objective of the coffee substitute to provide a process for a non-caffeine beverage with optimal calorie distribution. Such a hot drink provides an excellent means to eliminate waste from the body. It further acts as a buffer to prevent discomfort when the user is consuming many nutritional supplements at one time. Additionally it aids in preventing hypoglycemia and helping to reduce hyperglycemia, hypercholesterol and overweight.

Another objective of the present art is to introduce this coffee substitute as a native carrier of herb therapy thus achieving novel taste and a formulation that is biochemically cooperative.

Yet another important objective is to prepare a product that not only has delicious taste, but importantly contains a naturally high content of arginine-phenylalanine-isolucine-valine-serine-aspartic acid-leucine which have the highest inverse rate of hypercholesterol, optimal mineral and vitamins, complex carbohydrates and fiber which flatten the postprandial glycemia response and improve the glucose intolerance; and less than 1% vegetable fat by weight which are mainly unsaturated fat acid and are less than average daily elimination (17.5% of dry feces).

Presoaking, pressured boiling, steaming, light roasting, oil spraying, blending and grinding are used to achieve a tasty healthy beverage. This highly nutritional beverage can be consumed independently. This beverage can also be used as a medium to deliver herbal remedies and nutritional supplements, as well as an additive of coffee, tea or chocolate for enhancing the nutritional value of these products. It is especially suitable for individuals who are suffer from conditions making them caffeine intolerant, e.g., pregnancy, or those who suffer from hypoglycemia, hypertension, arrhythmia, insomnia, or gastric irritation. The beverage can also be specially formulated by adding edible herbs and seasonings, for use in the control of weight, hypercholesterol, cardiovascular disease, diabetes, arthritis, cold, and kidney stones.

Other features and advantages of the coffee substitute will become more apparent with the accompanying method, which illustrates, by the way of example, the principle of the invention.

BRIEF DESCRIPTION OF THE DRAWING

FIG. 1 is a flow chart illustrating a preferred process and the main entrances of the ingredients.

FIG. 2 is a figure showing a preferred food structure and synergetic health function.

FIG. 3 is a graph showing ideal food absorption and postprandial glucose/lipid levels.

FIG. 3A showing multiple calorie sources flattening the postprandial glucose/lipid response.

FIG. 3B showing different tonic and solubility foods flattening the postprandial glucose/lipid response.

FIG. 3C showing continuing low calorie-low fat drinking keeping normal glucose/lipid levels.

DETAILED DESCRIPTION OF THE PREFERRED EMBODIMENTS

The preferred basic starting materials for the present invention are grain flour, legume flour wheat, wheat germ, mung bean, rice, millet, or spelt. At least half of the flour particles are smaller than 175 microns. Alternatively, the starting material is a blending of multiple grains and legume with not more than 30% of seeds, nuts, or milk. Most vegetable oil is preheated and is preferably blended before the roast. However, coffee oil or essential oil is blended after the roast. Legume or rice is presoaked and washed between 15 minutes and 24 hours to soften and open the pores and to remove the unwanted bean taste and antinutritional components. The product is pressure boiled to about 100° C. to 105° C. for 5 minutes to 2 hours until tender or just before legumes start to exhibit minimum fracture. This will allow maximum penetration by the water and resolve any bitter and unwanted taste from the edible material. Then the material is drained.

The present coffee substitute aroma is produced by the coffee roast manufacturing. Differentiated from statutory H 673 "Over roasting", the present art uses light roast until its color turned to yellow to light cinnamon. Light roasting means the majority of the nutritional benefit should not be destroyed or burned into a dark carbon residue. The heat-treated base smells best when it turns to a light yellow to golden color. Coffee, instant, sugar sweetened, cappuccino flow, powder contains 1.3% water, 437 calories, 3.1% protein, 14.9% g lipid, 75.4% of carbohydrate and 4.1% of ash. 12.86 g of 14.9 g of coffee lipids are saturated lipids which stand heavy roast (United States Department of Agriculture: Composition of Foods, 1984). Grains, non-soy legumes, nuts and seeds are mainly polyunsaturated fatty acids and are easily oxydated during heavy roast which should be avoided.

Oil spaying or blending is preheated near its boiling point temperature which will facilitate oil's penetrating and absorption, aroma development, smooth mouth feel, and provide a lipid content up to 12% by weight, preferably 2–10% by weight to balance the calorie distribution and to slow down the digestion and absorption.

While it is not desired to be bound by theory, it is believed that the excellent flavor and aroma of the present invention results from the light roasting of a combination of multiple carbohydrate, lipid and protein components somewhat close to the temperature range of carmerization. Further, this product relies on its broad ingredients to achieve an unity coaction of the mixture during heat process to form an independent aroma.

In contrast to high fat, high protein coffee and its substitute standing heavy roast, this low protein, low fat or "no fat" coffee substitute stands light and short roast the best. It is well known that over heated camerization turns sweet to bitter, and increase constipation. Light and short roast protect ingredients being turned into carbon.

A milk powder can be added before light roast to enhance rich aroma development. Flowers are most vulnerable to roast and are blended at the end of the process. Chestnut, garlic, and nuts are preferably blended before the roast to join the aroma development.

Conventional coffee is best dissolve by hot water in 19 seconds from the residual granules. However, this present coffee-type beverage doesn't require the 19 seconds rule. The present coffee-type roast aroma is derived mainly from grain/legume with nuts, seeds, herb, red date, or milk to coact in harmony and to reasonably cover the range of 500-coffee aroma related ingredients.

Presoaking and boiling are provided to thoroughly remove the bean order, antitrypsin and unwanted factors. Moisture heat is used to improve the yield and solubility. As a whole result, the present aroma is a pleasant independent flavor, which is even more acceptable than initial coffee.

The coffee substitute is nutritionally balanced. The product can be easily converted to a beverage by mixing as a cream with coffee or tea or by simply adding hot water or liquid.

According to RDA, a range of chromium intakes between 50 and 200 ug/day is tentatively recommended for adults. Anderson and Kozlovsky found that the average chromium intake between 25–33 ug/day from self-selected diets of adults in Beltsville, Md., in diets containing 1,600 and 2,300 calories, respectively. A fine food process may reduce the chromium content of wheat to ⅓. Therefore, chromium is incorporated into this coffee substitute. Improved from prior art patent U.S. Pat. No. 4,954,492, U.S. Pat. No. 4,923,855 which used a chromium bar for diabetic control, the present art has a round focus on synergetic function based on legume, glutinous rice, and herb to help diabetic control.

According to RDA, the recommended allowance of zinc for adult men is set at 15 mg/day and the allowance for adult women, because of their lower body weight, is set at 12 mg/day. Excessive zinc intake results in gastrointestinal irritation and vomiting and even impairs various immune responses. Zinc supplements exceeding 15 mg/day are not recommended without adequate medical supervision. Pennington et al. (1984), in a survey of U.S. food, found about 13.2 mg of zinc in a 2,850 Kcal diet. This is the reason why the zinc supplement in the kidney stone formula is hereinafter described only 2 mg/day, preferably through an approach of zinc rich food e.g., walnut (3.42 mg/100 g, sunflower seed (5.06 mg/100 g), sesame (7.75 mg/100 g), pumpkin and squash seeds (10.30 mg/100 g). Recommend Daily Allowance of fiber can be easily met by present coffee substitute e.g., Beans, Kidney, Royal Red, Raw contains 6.17 g crude fiber per 100 g edible portion. (Agriculture Department of US: Composition of Foods, 1984)

Analyses of national food composites in the U.S. indicate that the overall adult mean dietary selenium intake ranged from 83 to 129 ug. Since the RDA is 70 and 55 ug/day for the reference adult in North American male and female respectively, selenium is not used in the present art.

Garlic and onion may boost the human immune system. Many laboratory studies demonstrate the effectiveness of tea polyphenols against tumor formation and growth. Ginkgo bileba can increase the blood flow to the brain, thus increasing brain alpha rhythms and memory.

According to German clinical research, ginkgo biloba extract is indicated for cerebral insufficiency and atherosclerotic disease. Ginkgo biloba leaf is similar to the flavonoid fraction, containing free radical scavengers and it needs no prescription.

Legumes can effectively reduce the blood glucose rise and prolong the postprandial satiety. Grains have a pleasant aroma and a comfortable taste during a low to medium heat. Most grains contain only about 0.5–0.6% fatty acids, most of that are polyunsaturated acids and are considered "No fat" by FDA. The mixture of grains and non-soy legumes contains complex carbohydrate, fiber, rich potassium and essential mineral, trace elements, vitamins, all essential amino acids and the amino acids having the best inverse hypercholesterol rate, and contain very little fat. The amount of this fat content is even less than the minimum daily elimination (17.5% of feces dry weight) and should help reducing the overall body fat content.

The human body needs more than hundred kinds of foods to stay healthy but most prior products are made of a few kinds of foods. Customers must buy many kinds of foods, calculate each, and put them together in a right way. The aroma of the present product developed from a process coaction among grains/legumes/nuts/seeds/milk/oil mixture during roasting will not only bring a novel taste to compensate nutritional balance but also cover broad individual health requirement in a simple food serving line.

The coffee substitute uses ginseng for increasing the immune system as well as for its long-term affect on human performance.

Walnut is added for its roasting aroma, memory promotion, and its effect on lowering blood lipid and blood pressure in normal men.

Since this coffee substitute has been sterized above 120° C., sealed packaged, and contains not more than 8% of moisture content, preferably not more than 4.5% of moisture, no preservative is needed.

This nutritional coffee substitute can be illustrated by examples as the following:

(All weight percentages mean dry weight unless otherwise indicated)

EXAMPLE 1

A basic Sweet Hot Drink Mixture is formed with a formulation as follows:

| Ingredient | Dry Weight % |
| --- | --- |
| Mung bean | 70 |
| Spelt | 12 |
| Nut | 10 |
| Sesame seed | 1 |
| Fructose | 5 |
| Seasoning* | 2 |

*Dehydrated and shredded garlic, onion, carrot and parsley.

This product is used with coffee, tea, milk, or used as an independent regular hot drink.

EXAMPLE 2

A basic rich hot drink mixture is formed with a formula as follows:

| Ingredient | Dry Weight % |
| --- | --- |
| Wheat | 50 |
| Millet | 20 |
| Whole milk powder | 20 |
| Peanut | 5 |
| Olive oil | 5 |

All wheat, milk powder, millet and peanut are roasted together. This product is preferably used with coffee, tea, chocolate, margarine and butter or used as an independent hot beverage.

EXAMPLE 3

A Diet Flower/Fruit Hot Drink Mixture is formed with a formulation as follows:

| Ingredient | Dry Weight % |
| --- | --- |
| Glutinous rice | 68 |
| Wheat | 20 |
| Flower* | 1 |
| Blackstrap Molasses | 10 |
| Fruit/Orange skin | 1 |

*Flower e.g., roses, osmanhus, or Jasmine

This product is used with coffee, tea, chocolate, milk, red wine or used as an independent hot drink.

EXAMPLE 4

An Anti-aging Formula is formed with a formulation as follows:

| Ingredient | Weight % |
| --- | --- |
| Glutinous rice | 55 |
| Black bean | 24 |
| Black sesame | 1 |
| Knotweed root | 10 |
| Rehmannia glutinosa | 9.6 |
| Bean pollen | 0.2 |

-continued

An Anti-aging Formula is formed with a formulation as follows:

| Ingredient | Weight % |
|---|---|
| Ginkgo Biloba leaf | 0.1 |
| Ginseng | 0.1 |

This formula is used as an independent hot drink for improving cardiovascular and brain circulation, immune system, hair maintenance, aging situation and overall performance. It can be mixed with red wine and/or honey but should not be used for hypertension or insomnia.

EXAMPLE 5

A Kidney Stone Reduction Formula is formed with a formulation as follows:

| Ingredient | Weight % |
|---|---|
| Glutinous rice | 48–60 |
| Walnut | 10–20 |
| Barley | 20 |
| Cranberry | 7.7–8 |
| Desmodrum Styracifolium | 2 |
| Ginkgo Libola | 0.1 |
| Sodium citrate | 0.1–2 |
| Zinc | 0.002 |

Most high protein component is removed to reduce kidney load. This formula is used with soda or as an independent hot beverage for preventing kidney stone and urology problem.

EXAMPLE 6

A Diabetic and Weight Control Formula is formed with a formulation as follows:

| Ingredient | Weight % |
|---|---|
| White or red bean | 30 |
| Glutinous rice | 24 |
| Mung bean | 30 |
| Ophiopogon Japonicus | 10 |
| Astragalus | 3 |
| Trichosantes | 2 |
| Guar/xanthan | 0.05–1 |
| Dendrobine | 0.5 |
| Selenium | trace |
| Chromium | 0.00005 |

This product is used as an independent hot beverage for helping diet and diabetic control.

EXAMPLE 7

A beverage to soothe Gastric Irritation and reducing diarrhea are formed as follows:

| Ingredient | Weight % |
|---|---|
| Millet | 40 |
| Wheat | 30 |
| Glutinous rice | 10 |
| Skim milk powder | 16 |

-continued

A beverage to soothe Gastric Irritation and reducing diarrhea are formed as follows:

| Ingredient | Weight % |
|---|---|
| Cabbage | 2 |
| Garlic/onion/parsley | 1 |
| Orange skin | 1 |
| Salt | adjusted to near ½ isotonic solution |

This product is used with tea or used as independent hot beverage to soothe gastric irritation and reducing flatulence.

EXAMPLE 8

A beverage for soothing common cold is prepared as follows:

| Ingredient | Weight % |
|---|---|
| Millet | 30 |
| Wheat | 30 |
| Milk* | 20 |
| Garlic | 3 |
| White part of green onion | 5 |
| Fresh ginger roots or extract | 2 |
| Ledebouriella root | 1 |
| Isatis tinctoria | 1 |
| Mint/thyme/rosemary | 0.1–0.5 |
| Sugar | 7–7.5 |

*Fresh milk power is preferably produced from vaccine mammal milk and freeze dried.

EXAMPLE 9

A beverage for reducing hypercholesterol/hyperglycemia is prepared as follows:

| Ingredient | Weight % |
|---|---|
| Navy bean (white bean) | 20 |
| Spelt | 20 |
| Glutinous rice | 20 |
| Wheat germ | 11–12 |
| Black kidney bean | 10 |
| Mung bean | 10 |
| Mineral | adjustable |
| Vitamin & nutritional supplement | trace |
| Licium barbarum | 6 |
| Psyllium | 2 |
| Trace elements | trace |

Following a high fat meal there may be so much lipid that the plasma appears "milky". High lipid content tends to deposit. Insulin promotes fat intake by body cells. Since there is no second line defense to protect the body from high blood lipid levels, the best prevention method is to provide a steady liquid energy supply with a very low fat content ($\leq$ daily feces elimination) for avoiding a high lipid load.

Mineral, trace element, vitamin and nutritional supplement are adjusted to RDA. Significant amino acids are adjusted to approximately arginine 4%, phenylalanine 0–2%, isoleucine 3%, valine 2%, serine 1%, aspartic acid 1%, leucine 2% by weight. Total protein is controlled to less than 20% because protein can increase the cholesterol level even more than fat content. Total carbohydrate content is controlled within the range of 70–90%. Total fat is not more than 1%. This non-fat, high inverse cholesterol amino acids beverage is utilized about 100 ml per hour or 100 calories per hour. The mean value is about 100 calories in 100 ml beverage per hour. The water requirement is calculated as 1–1.5 ml per calorie. So drinking 150 ml per hour will provide 150 calories energy per hour. Drinking 150 ml beverage per hour during 10 hour period will provide 1500 calories and 1500 ml water for a resting person on a diet. This product provides a balanced nutrition with additional health function in an easy controlled constant rate. Since a high content of glucose and lipid intake within a short period is most stressful for the body to handle and most tend to be turned into fat deposit, this formula is particularly useful for a person suffered from hypercholesterol, glucose intolerance, and overweight.

All of the products illustrated in the examples are rapidly dissolved in hot water or liquid and quickly provide a drinkable beverage, which is 5–40% solid by weight and provide 20–150 calories per 100 ml liquid. Suitable emulsifiers and stabilizers can be added. The total water content of the package is less than 8% of the total weight, preferably less than 4.5% of the total weight. The product is not only an additive to coffee or tea drinks as a cream, but also it is an independent beverage with a durable energy supply and a native synergetic carrier of herbal remedies and/or nutritional supplements. The use of this product will truly bring real acceptance of phytotherapy.

The instant formulations are near neutral range and contain no artificial coloring or flavoring, no digestive enzymes or yeast, no negative function or pH conflict. They are neither habit forming or addictive.

The formulations can be produced by using the coffee manufacturing process with grain and legume. The result is an aromatic beverage with herbal remedies that is enjoyable to drink.

Preparation of vegetable

Cut 1 kg vegetable into pieces of about 1 mm by 1 mm size or less.

30–90 gram of salt and 5–10 gram of sugar are mixed with the particulate vegetable.

The mixed vegetables are dehydrated.

Preservative can be added but no more than 0.02–2%.

Preparation of flower

Soak in saline solution up to 3 minutes to dissolve remaining chemical.

Completely drain.

Cold dehydrate.

Preparation of herb leaf

Steam at a temperature approximately 90–110° C. for approximately 0.5–5 minutes

Cut into pieces of about 0.5–2 mm square size.

Preparation of herb root/stem

Boil with water or red bean at a temperature approximately 90–100° C. for approximately 5–60 minutes, steam at a temperature approximately 95–105° C. for 5–60 minutes, and drain Cut into pieces of about 0.5–2 mm square size.

Extract herb compounds

Use alcohol or boiling water to resolve the herb components

Filter the solution

Freeze dry or spray dry the solution

Collect the remaining powder form

Herb, flower, vegetable, or nutritional supplement is added at the end of the process under regular temperature.

The present product contains herb up to 12% by weight, vegetable up to 10% by weight, nutrition supplement up to 0.2% by weight, or nut up to 15% by weight.

As an herbal therapy, this hot beverage is used for health maintenance. Such hot beverage is not restricted to the examples previously set forth. The examples can be varied and modified without deviating from the scope or spirit of the present art. As previously mentioned, additional ingredients can be added, such as dehydrated seasonings, herbs or nutritional supplements, thereby providing a series of hot beverages derived from grain, legume, seed, nut, oil and herb. Such series of products are intended to be covered by the following claims:

What is claimed is:

1. A process for preparing a brewable coffee-type product, comprises the steps of:

providing an edible base from grain, legume, or a mixture thereof, grinding said edible base with crushing in a temperature approximately from 30° C. to 100° C. until at least 50% of the base material attaining 5–75$\mu$ in size, roasting said ground and crushed base material at a temperature approximately 120–200° C. for approximately 10 seconds–20 minutes or to a color from yellow to light cinnamon, with water content up to 10% by weight to develop a coffee-like aroma and increase dissolve yield for rehydration upon adding liquid.

2. The process in claim 1 wherein said grain being selected from wheat, rice, wheat germ, spelt, buckwheat, barley, millet, or a mixture.

3. The process of claim 1 further comprises a step of roasting said base with seeds, chestnuts, red date milk, or mixture up to 30% by weight.

4. The process of claim 1 further comprises a step of oil spraying at a temperature between about 120° C. and 195° C., whereby said oil is preheated near its boil point temperature which will facilitate oil penetrating and provide a lipid content approximately 2–10% by total weight that will balance calorie distribution and slow digestion and absorption.

5. The process of claim 1 further comprises a step of blending said base after said roasting with edible herb up to 15% by dry weight, with mineral up to 1% by dry weight, with nutritional supplement up to 0.2% by dry weight.

6. The process in claim 5 further comprises a step of blending said base with ginseng, ginkgo biloba, walnut, bee pollen, or a mixture thereof.

7. The process in claim 5 further comprises a step of blending said base with esmodium styraciforlium, bee pollen, ginkgo biloba, ginseng, ligum aquilariae resinatum, black bean, walnut, barley, zinc, vitamin E, or a mixture thereof.

8. The process of claim 5 further comprises a step of blending said base with ophiopogon japonicus, trichosantes kirilowii, dendrobine, legume, glutinous rice, chromium, or mixture thereof.

9. The process of claim 5 further comprising a step of blending said base with sausurea lappa, orange skin, millet, wheat, cabbage, garlic, or a mixture thereof.

10. The process of claim 5 further comprising a step of blending said base with ginger root, green onion, garlic, mint, rosemary, thyme, ledebouriella root, isatis titictoria, or a mixture thereof.

11. The process of claim 5 further comprising a step of blending said base with polygonum multiflorum, cassia obtusifolia, lycium barbarum, scophularia ninggpoensis, rehmannia glutinosa, psyllium, or a mixture thereof.

12. The process of claim 1 wherein said edible base further comprises by weight fat content up to 0.5%, carbohydrate content approximately 66–83%, fiber content approximately 0.2–5%, protein content approximately 17–34%, arginine 4%, phenylalanine ss0–2%, isoleucine 3%, valine 2%, serine 1%, aspartic acid 1%, and leucine 2%.

* * * * *